Figures 1, 2:
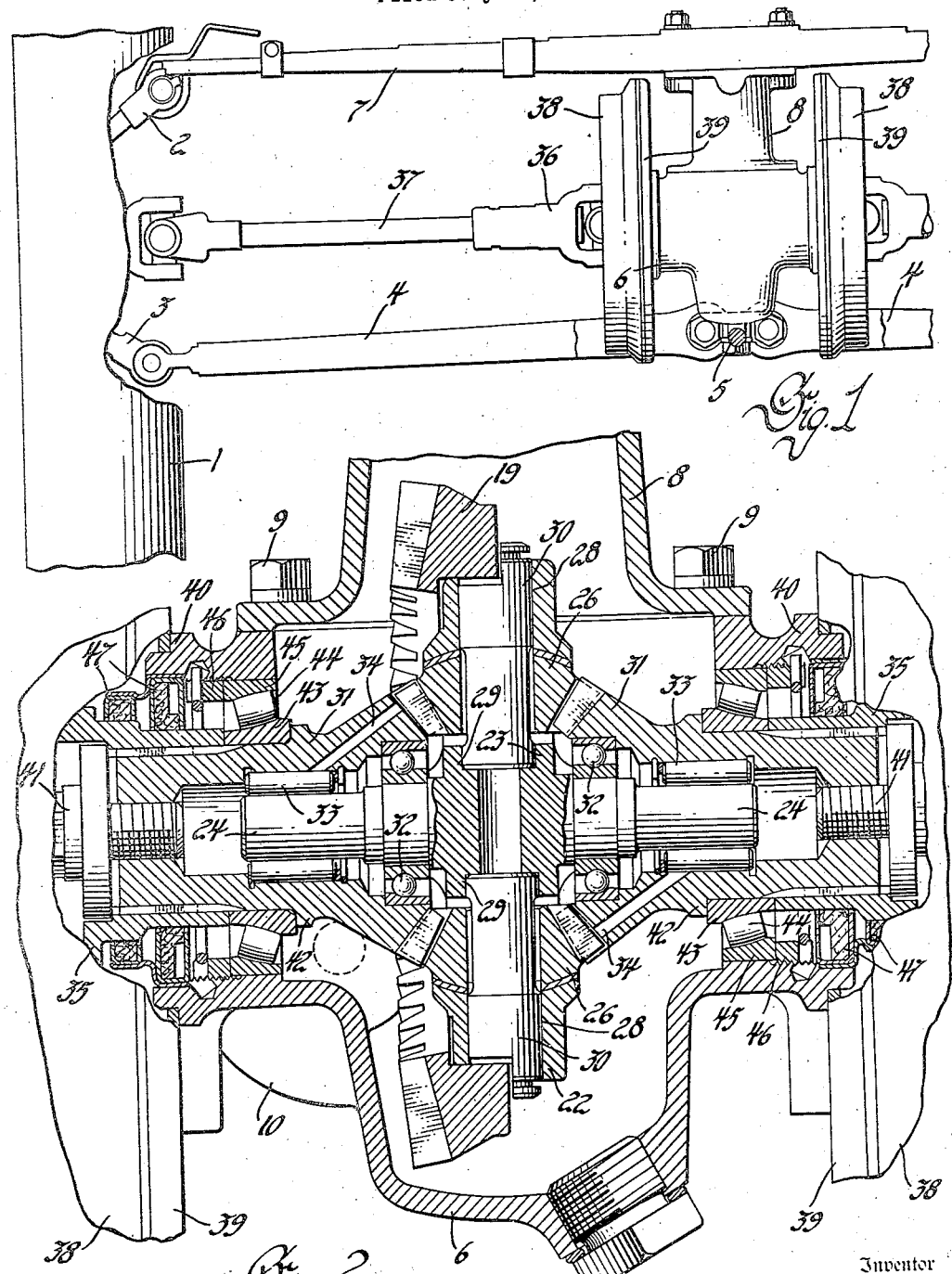

Oct. 8, 1946.     B. GRIFFITH     2,408,926
DRIVE AXLE
Filed July 15, 1944     4 Sheets-Sheet 1

Inventor
Bain Griffith
By
Attorneys

Oct. 8, 1946.     B. GRIFFITH     2,408,926
DRIVE AXLE
Filed July 15, 1944     4 Sheets-Sheet 2

Inventor
Bain Griffith
By
Blackmore, Spencer & Flint
Attorney

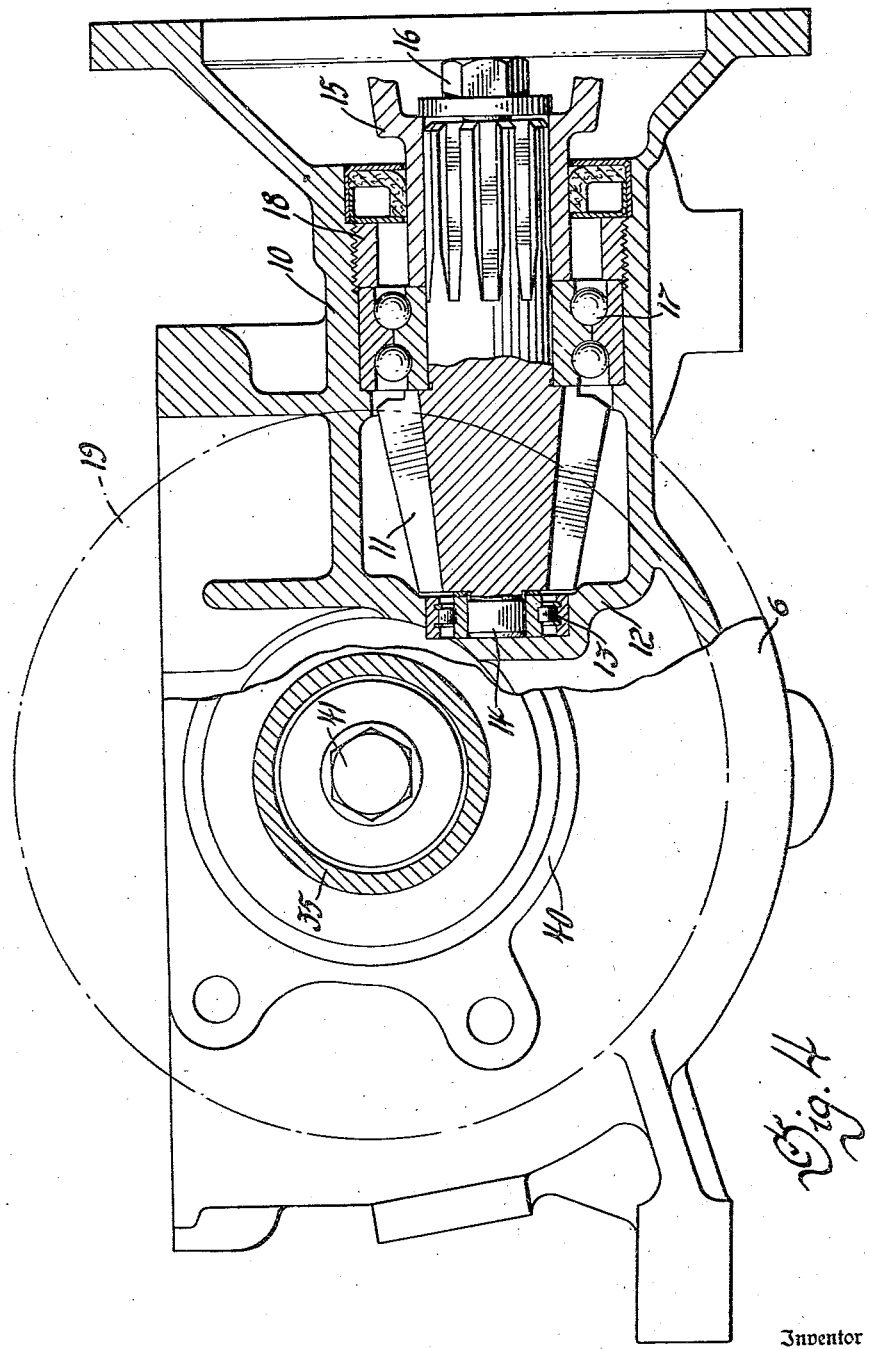

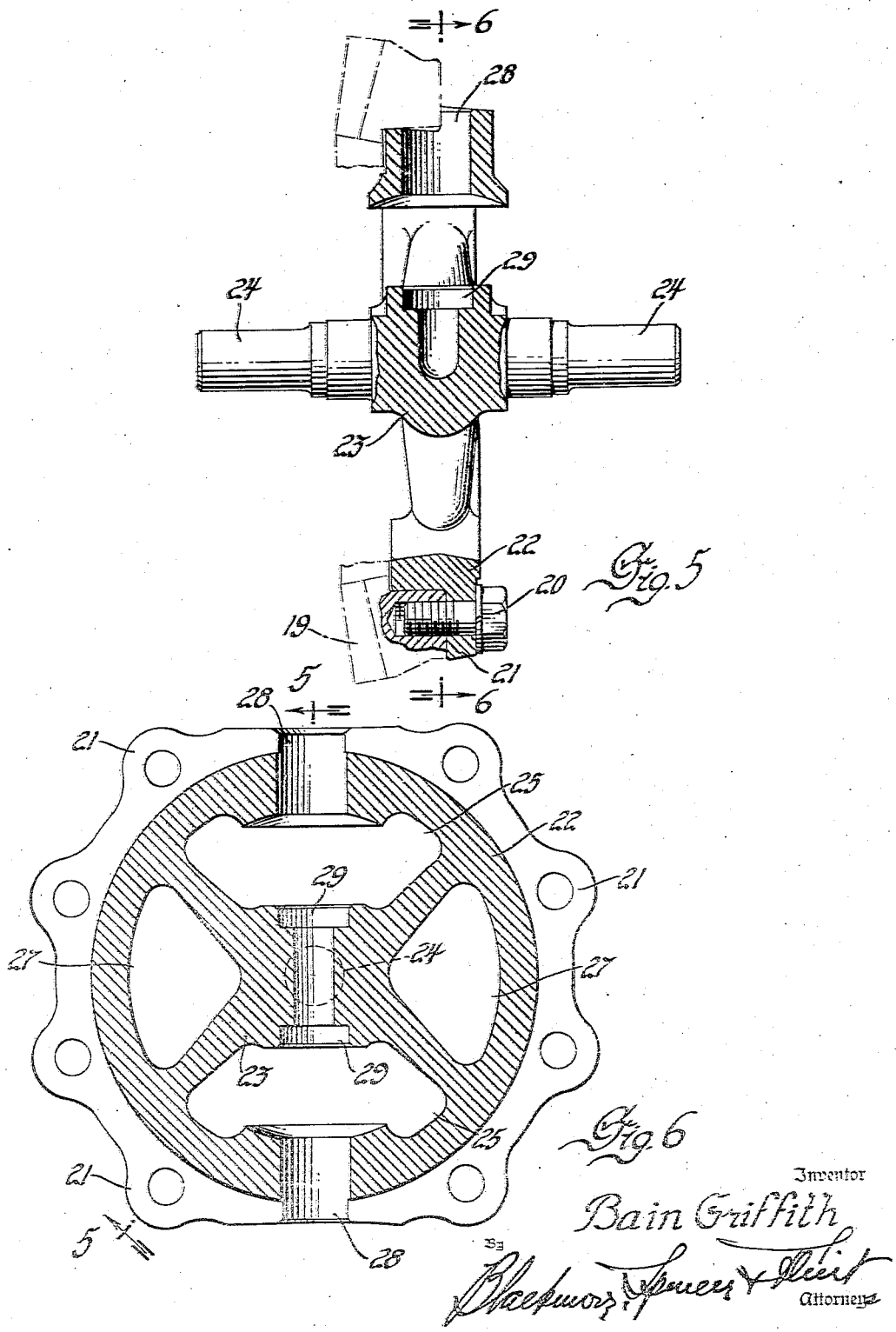

Patented Oct. 8, 1946

2,408,926

UNITED STATES PATENT OFFICE 2,408,926

DRIVE AXLE

Bain Griffith, Detroit, Mich., assignor to General Motors Corporation, Detroit, Mich., a corporation of Delaware Application July 15, 1944, Serial No. 545,138

4 Claims. (Cl. 74—311)

This invention relates to automotive running gear and more particularly to an improved power transmitting differential, the design factors of which were influenced primarily by exacting requirements of compactness and lightweight. It goes without saying that where an abundance of space is available and weight is no object, design work is largely in the selection of suitable existing equipment, whereas limitations on bulk and weight more often introduce new problems calling for rearrangement and different shape, as well as more precision and varied manufacturing procedure.

The structure of this invention was designed for use in a motor vehicle smaller than the ordinary present-day automobile to carry a pay load of a few hundred pounds, including the driver, and having a tread of only 42" and a wheelbase of 64" with a conventional motorcycle type engine driving all four wheels, the wheels being independently suspended and both the front and rear differential mechanisms being hung on the underside of the body as a part of the sprung weight. The drive forces transmitted, coupled with the desire to employ hypoid axle gears, results in a relatively small diameter ring gear and this is accommodated with clearance for the drive pinion and with an improved reduction in overall size by discarding entirely the usual bulky differential cage which ordinarily carries the ring gear and encloses both the differential and the side gears and is itself mounted in the axle housing.

In place of the external rotatable cage a sturdy mounting of and a more compact differential assembly is provided by supporting the side gears in main bearings directly in the housing and using the side gears to support therebetween an internal carrier wheel for the ring gear and the differential gears which mesh with the side gears. Whereas the ordinary external cage is a malleable iron casting made in two halves bolted together and supported at opposite ends in the axle housing, the present internal carrier wheel is a single forged steel piece occupying the axial space between hollow side gears and having integral oppositely projecting central trunnion pins rotatably mounted interiorly of the hollow side gears, each by means of axially spaced bearings which resist relative cocking of the side gears in the main bearings and serve to maintain axial alignment of the parts and assist in the mutual cooperation of the side gears in the support of the load by the main bearings.

The new design enables a condensed size housing to be employed and the entire assembly is more compact, uses less material and is of lightweight. In quantity production a steel forging is cheaper, easier and quicker to produce and machine. It not only takes up less space but eliminates the need for a large ring gear to provide clearance for the pinion. With more room available the pinion may be brought closer to the axis of the axle shafts and the gears are in better balance with respect to tooth pressures. Bearing placement and installation is simplified.

Figure 3:
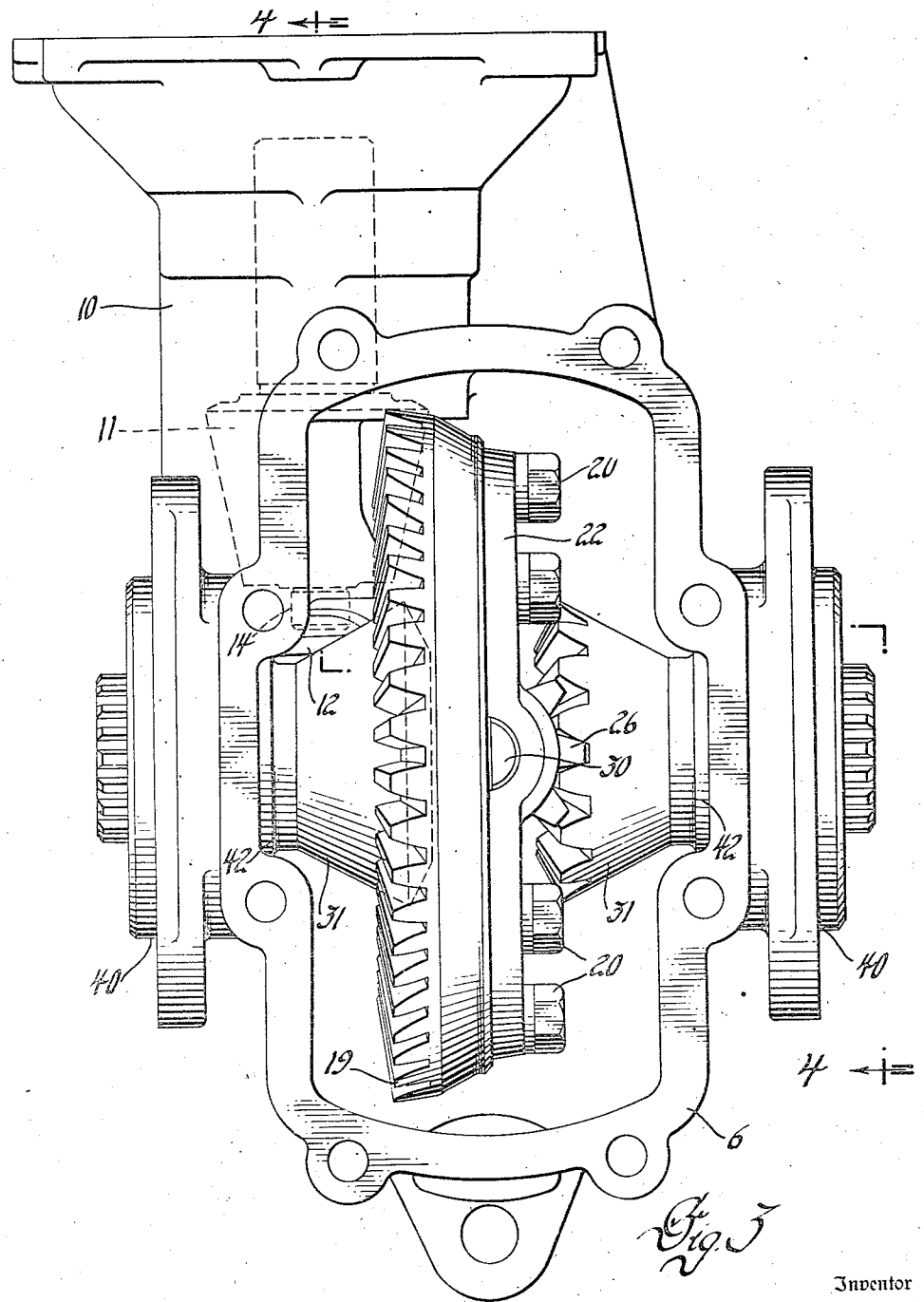

For a clearer explanation of the improved structure reference will be made to the accompanying drawings wherein Figure 1 is an elevation of a portion of a drive axle; Figure 2 is a vertical transverse section of the differential assembly; Figure 3 is a top plan view with the cover removed from the casing; Figure 4 is a side elevation of the casing with a part in section as on line 4—4 of Figure 3; Figure 5 is a sectional view as on line 5—5 of Figure 6, showing the internal carrier wheel detail and Figure 6 is a section on line 6—6 of Figure 5.

In the drawings the reference numeral 1 indicates a tire on a road wheel whose hub is rotatably mounted in a sleeve having upper and lower support arms 2 and 3, respectively. A pivot connection joins the arm 3 with the outer end of a radius lever 4 whose inner end is journaled in a suitable bracket 5 secured to the bottom of the differential casing 6. A similar pivot connection joins the upper arm 2 to one end of a multiple leaf spring 7 extending across the vehicle and centrally secured to the upstanding cover 8 for the casing 6. Figure 1 shows the drive and suspension for a pair of wheels with a fragment of one wheel only, it being understood that the two wheels are located by radius arms 4 and have the load transmitted to them through the leaf spring 7 which extends transversely of the vehicle and is centrally secured to the vehicle in any suitable fashion. The differential mechanism is a part of the sprung weight and the casing 6 and cover 8 are detachably secured together by a series of bolts, as shown at 9.

One side of the casing 6 is formed with a longitudinally extending tubular portion 10, as best seen in Figures 3 and 4, in which is mounted the hypoid drive pinion 11. An end wall 12 of the tubular projection 10 has a depressed pocket in which is located a roller bearing 13 for a projecting nose or stub 14 beyond the pinion 11. The pinion shaft at its opposite end is externally splined to receive a drive coupling sleeve 15 which is internally secured by a fastening stud 16 and holds in place the internal race of a ball bearing assembly 17, whose outer race is secured within the tubular extension 10 between an intermediate shoulder and a detachable screw threaded ring 18.

Driven from the hypoid pinion 11 is a ring gear 19 secured by a series of studs 20 to a group of lugs 21 cooperating to provide a peripherally shouldered portion on the rim 22 of a disk-like wheel or spider whose hub 23 has a pair of oppositely projecting axle pins 24—24. This carrier preferably is a steel forging formed with the axle pins integral therewith and machined to the desired shape. Lateral openings 25—25 extending from one side to the other provide mounting spaces for the differential pinions 26—26 and additional lateral openings 27—27 are formed to keep down excess weight and form a wheel-like structure with spokes connecting the hub 23 with the peripheral rim 22. At each gear opening 25, a radial opening or socket 28 is drilled inwardly through the rim 22 in alignment with a shallow socket 29 in the hub 23 and located by these parts are the opposite ends of a radial locating pin 30 projecting through the adjoining differential gear 26. Each pin at its outer end is partially overlapped by the ring gear 19 and has a notched out corner portion for interlocking engagement with the ring gear.

The central carrier may be designed for use with one or more differential pinions 26 and in any event such pinion is in constant mesh with gear teeth formed on the end faces of a pair of tubular or hollow side gears 31—31 which receive internally thereof the axle pins 24—24. Between each side gear and the enclosed trunnion pin are a pair of axially spaced antifriction bearings, which not only support the parts for relative rotation but also insure against relative tilting. One of these bearing assemblies indicated at 32 is a combined radial and thrust bearing while the other bearing assembly 33 is preferably in the nature of a fairly long roller bearing. A lubricant duct 34 connects the bearing surface with the gear teeth in the one end of the tubular side gear.

The opposite end of the side gear is externally splined to receive the coupling sleeve 35 of one element of a universal joint 36. This joint has a sliding splined connection with an inner end of an axle shaft 37 whose outer end is universally joined with the driving hub for the road wheel. The coupling sleeve 35 is also arranged to carry the brake drum 38 with which cooperates internal expanding shoes mounted on a backing plate 39 which is fitted and secured to a shouldered seat 40 on the side wall of the casing 6. A central stud 41 threadedly engaging the outer end of the side gear 31 retains the coupling sleeve 35 in splined engagement with the gear and also clamps against the intermediate shoulder 42, the inner race 43 of the main bearing which is a combined radial and thrust type having barrel rollers 44 and an outer race 45 secured in the side wall opening of the casing 6 by a threaded ring 46. Beyond the main bearing are located tandem grease and dirt seals 47 whose primary purpose is to prevent the leakage of grease from the differential casing into the brakes.

I claim:

1. In combination, a differential gear carrier having centrally disposed bearing trunnions projecting oppositely therefrom, a pair of tubular supports axially spaced on opposite sides of the carrier and surrounding said trunnions, trunnion bearings internally of said tubular supports, side gears on the inner ends of said tubular supports and external splines on the outer ends thereof, a centrally disposed external shouldered abutment on each tubular support, a supporting bearing having an inner race ring seated on said shouldered abutment, a drive coupling hub fitted to said external splines in retaining engagement with said race ring and a retaining means threadedly fitted to the end of the tubular support and engaged with the coupling hub for detachable connection thereof.

2. In a differential drive assembly, a supporting casing having aligned openings in opposite side walls, a pair of bearings secured in said openings for insertion and removal from the casing exterior, tubular hollow side gears projected through the openings and rotatably mounted by said bearings, the outside diameter of said hollow side gears being less than the diameter of said openings to enable axial passage through the openings of said hollow side gears toward and from one another from the casing exterior, and a differential gear carrier interposed between the hollow side gears with supporting trunnion pins projected oppositely therefrom for telescopic reception within the inner ends of the hollow side gears.

3. In a differential drive arrangement, a centrally located differential gear carrier having a pair of supporting trunnions projecting oppositely therefrom and each trunnion having in axially spaced relation an inner cylindrical portion and an outer terminal shaft portion of smaller diameter than the inner cylindrical portion, a pair of side gears of hollow tubular formation with driven teeth on the inner end faces thereof and into which said trunnions project, a pair of axially spaced antifriction bearing assemblies between each hollow side gear and the trunnion supported thereby, one of said assemblies being a roller bearing engaging the terminal shaft portion for taking radial load and the other of said assemblies being a thrust bearing assembly having inner and outer races fitted to said inner cylindrical portion and the inner end of the hollow carrier, respectively, a combined radial and thurst bearing fitted to an exteriorly shouldered seat of each of said tubular side gears in axially spaced relation with the thrust bearing assembly aforesaid and with its inner race of an internal diameter approximating the external diameter of the outer race of said thrust bearing and a pair of supporting walls through which the tubular portions of said side gears project for mounting the outer races of said combined radial and thrust bearings.

4. In a differential drive arrangement, a pair of spaced supports, a pair of tubular hollow differentially driven members projecting through the supports and having external shouldered seats, thrust bearing assemblies fitted to said seats and mounted by the supports, a differential gear carrier centrally interposed between said hollow members and formed with oppositely projecting supporting trunnion pins extending into the hollow members and thrust bearing assemblies interposed between the trunnion pins and said members in axially spaced relation to the first mentioned thrust bearing assemblies and of an external diameter approximating that of said shouldered seats.

BAIN GRIFFITH.